United States Patent
Kolouri

(10) Patent No.: US 11,037,030 B1
(45) Date of Patent: Jun. 15, 2021

(54) SYSTEM AND METHOD FOR DIRECT LEARNING FROM RAW TOMOGRAPHIC DATA

(71) Applicant: HRL LABORATORIES, LLC, Malibu, CA (US)

(72) Inventor: Soheil Kolouri, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 76 days.

(21) Appl. No.: 16/593,572

(22) Filed: Oct. 4, 2019

Related U.S. Application Data

(60) Provisional application No. 62/752,208, filed on Oct. 29, 2018.

(51) Int. Cl.
*G06K 9/62* (2006.01)
*G06N 3/04* (2006.01)
(Continued)

(52) U.S. Cl.
CPC ............ *G06K 9/6267* (2013.01); *G01S 13/90* (2013.01); *G06F 17/15* (2013.01); *G06K 9/6256* (2013.01); *G06N 3/0481* (2013.01)

(58) Field of Classification Search
CPC .. G06K 9/6267; G06K 9/6256; G06T 7/0012; G06T 7/11; G06T 7/0016; G06T 11/005; G06T 11/006; G06T 11/008; G06T 11/003; G06T 2207/20084; G06T 2207/20081; G06T 2207/10081; G06T 2207/10088;
(Continued)

(56) References Cited

U.S. PATENT DOCUMENTS 10,497,154 B2 * 12/2019 Meganck ............... G06T 11/006
10,825,168 B2 * 11/2020 Tegzes ..................... G06T 7/11
(Continued)

OTHER PUBLICATIONS

"Lose the Views: Limited Angle CT Reconstruction via Implicit Sinogram Completion"; Rushil Anirudh, 2018 IEEE/CVF Conference on Computer Vision and Pattern Recognition (pp. 6343-6352) (Year: 2018).*
(Continued)

*Primary Examiner* — Michael S Osinski
(74) *Attorney, Agent, or Firm* — Lewis Roca Rothgerber Christie, LLP

(57) ABSTRACT

A method for computing classifications of raw tomographic data includes: supplying the raw tomographic data to a sinogram-convolutional neural network including blocks, at least one of the blocks being configured to perform a convolution of the raw tomographic data in Radon space with a convolutional kernel by: slicing the raw tomographic data into a plurality of one-dimensional tomographic data slices along an angle dimension of the raw tomographic data; slicing the convolutional kernel into a plurality of one-dimensional kernel slices along the angle dimension of the convolutional kernel; for each angle, computing a one-dimensional convolution between: a corresponding one of the one-dimensional tomographic data slices at the angle; and a corresponding one of the one-dimensional kernel slices at the angle; and collecting the one-dimensional convolutions at the angles; computing a plurality of features from the convolution; and computing the classifications of the raw tomographic data based on the features.

20 Claims, 11 Drawing Sheets

(51) Int. Cl.
*G06F 17/15* (2006.01)
*G01S 13/90* (2006.01)

(58) Field of Classification Search
CPC ..... G06T 3/4046; G06F 17/15; G06N 3/0481; G01S 13/90; A61B 6/032; A61B 6/037; A61B 6/5205
See application file for complete search history.

(56) References Cited

U.S. PATENT DOCUMENTS

| | | | | |
|---|---|---|---|---|
| 2012/0232379 | A1* | 9/2012 | Ionasec | G06T 7/12 600/414 |
| 2016/0143606 | A1* | 5/2016 | Yamakawa | A61B 6/4078 378/19 |
| 2017/0132793 | A1* | 5/2017 | Hu | G06T 7/12 |
| 2017/0303868 | A1* | 10/2017 | Lee | A61B 6/5258 |
| 2017/0356976 | A1* | 12/2017 | Shapiro | A61B 5/7267 |
| 2018/0018757 | A1* | 1/2018 | Suzuki | A61B 6/5205 |
| 2018/0129893 | A1* | 5/2018 | Son | G06N 3/063 |
| 2018/0143275 | A1* | 5/2018 | Sofka | G01R 33/5608 |
| 2018/0276825 | A1* | 9/2018 | Dai | A61B 5/7267 |
| 2018/0293762 | A1* | 10/2018 | Fu | G06T 11/006 |
| 2018/0360406 | A1* | 12/2018 | Haga | A61B 6/5205 |
| 2018/0365824 | A1* | 12/2018 | Yuh | G06T 7/0012 |
| 2018/0365828 | A1* | 12/2018 | Mansi | G06T 7/0012 |
| 2019/0026897 | A1* | 1/2019 | Wu | G06T 7/136 |
| 2019/0035117 | A1* | 1/2019 | Xing | G06T 5/002 |
| 2019/0069882 | A1* | 3/2019 | Moctezuma de la Barrera | A61B 34/10 |
| 2019/0139276 | A1* | 5/2019 | Lee | G06T 11/008 |
| 2019/0142338 | A1* | 5/2019 | Fang | A61B 5/0036 600/408 |
| 2019/0164045 | A1* | 5/2019 | Li | G06N 3/04 |
| 2019/0228529 | A1* | 7/2019 | Sun | G06T 7/11 |
| 2019/0307427 | A1* | 10/2019 | Levy | A61B 8/5246 |
| 2019/0336033 | A1* | 11/2019 | Takeshima | G06N 20/00 |
| 2019/0365341 | A1* | 12/2019 | Chan | G06T 7/0012 |
| 2020/0000396 | A1* | 1/2020 | Madabhushi | G06K 9/6256 |
| 2020/0027252 | A1* | 1/2020 | Ye | G01N 23/083 |
| 2020/0034998 | A1* | 1/2020 | Schlemper | G06K 9/4628 |
| 2020/0066393 | A1* | 2/2020 | Kaiser | G06N 3/0454 |
| 2020/0121376 | A1* | 4/2020 | Zhang | G06N 3/08 |
| 2020/0163645 | A1* | 5/2020 | Ewald | A61B 8/463 |
| 2020/0178910 | A1* | 6/2020 | Suzuki | A61B 6/56 |
| 2020/0202999 | A1* | 6/2020 | Takeshima | G06N 3/0454 |
| 2020/0311916 | A1* | 10/2020 | Tran | G06T 7/0016 |
| 2020/0357148 | A1* | 11/2020 | Soons | G06T 3/4076 |
| 2020/0380313 | A1* | 12/2020 | Keshwani | A61B 6/03 |

OTHER PUBLICATIONS

"Deep-Neural-Network-Based Sinogram Synthesis for Sparse-View CT Image Reconstruction"; Hoyeon Lee, IEEE Transactions on Radiation and Plasma Medical Sciences (vol. 3, Issue: 2, pp. 109-119) (Year: 2018).*

* cited by examiner

SYSTEM AND METHOD FOR DIRECT LEARNING FROM RAW TOMOGRAPHIC DATA

CROSS-REFERENCE TO RELATED APPLICATION(S)

This application claims priority to and the benefit of U.S. Provisional Patent Application No. 62/752,208, filed in the United States Patent and Trademark Office on Oct. 29, 2018, the entire disclosure of which is incorporated by reference herein.

FIELD

Aspects of embodiments of the present invention relate to systems and methods for analyzing raw tomographic data.

BACKGROUND

Tomographic imaging refers to imaging by sections or sectioning through the use of a penetrating wave and is typically used in various applications including: material inspection, 3D printing, assembly analysis, reverse engineering, synthetic aperture radar (SAR), and metrology. Due to the three-dimensional nature of the tomographic imaging process, tomograms captured through tomographic imaging are typically used to reconstruct images for further processing, either by displaying the reconstructed images to human operators and/or by processing the images using machine vision techniques.

These machine vision techniques for the automated analysis of the tomographic data sometimes make use of machine learning techniques. One example is the automated detection of air bubbles from micro-computed tomography (CT) data in 3D printing, or object detection from SAR data. State-of-the-art machine learning models including deep convolutional neural networks (CNNs) are incapable of analyzing raw tomographic data, as they are originally designed for natural images (e.g., images captured by a 2D camera). More importantly, these learning models are often built based on assumptions such as the locality of objects in an image, translation invariance, and the like, which do not hold for raw tomographic data.

SUMMARY

Aspects of embodiments of the present invention relate to systems and methods for processing and classifying raw tomographic data without performing an intermediate image reconstruction. Because image reconstruction from tomographic data generally includes a computationally expensive operation of solving an inverse problem (e.g., an inversion of the Radon transform) and generates noisy images, aspects of embodiments of the present invention improve the computational efficiency of analyzing tomographic data. Some aspects of embodiments of the present invention relate to the use of particular operators in the space of raw tomographic data (e.g., sinogram space, or Radon space) and using these particular operators in the Radon space to transfer a convolutional neural network (CNN) architecture defined for images into Radon space to make the CNN applicable to raw tomographic data, thereby avoiding the step of image reconstruction. For object detection in synthetic aperture radar (SAR) imagery, aspects of embodiments of the present invention reduce sensing, memory, and transmission requirements of radar by 10-100× and improves computation time to enable real-time operation. In experiments on synthetic computed tomography (CT) image classification from images and from raw data, trained CNNs performed accurately in the image domain, but failed to learn generalizable features from the raw CT data. In contrast, embodiments of the present invention achieve accurate results on the raw data.

According to one embodiment of the present invention, a method for computing classifications of raw tomographic data includes: supplying the raw tomographic data to a sinogram-convolutional neural network, the sinogram-convolutional neural network including a plurality of blocks connected to compute a plurality of features, at least one of the blocks being configured to perform a convolution of the raw tomographic data in Radon space with a convolutional kernel in Radon space by: slicing the raw tomographic data into a plurality of one-dimensional tomographic data slices along an angle dimension of the raw tomographic data; slicing the convolutional kernel into a plurality of one-dimensional kernel slices along the angle dimension of the convolutional kernel; for each angle of the angle dimension, computing a one-dimensional convolution between: a corresponding one of the one-dimensional tomographic data slices at the angle; and a corresponding one of the one-dimensional kernel slices at the angle; and collecting the one-dimensional convolutions at each of the angles to compute the convolution of the raw tomographic data in Radon space with the convolutional kernel in Radon space; extracting a plurality of features from the raw tomographic data in Radon space using the sinogram-convolutional network; and computing the classifications of the raw tomographic data based on the features.

At least one of the blocks may be configured to compute an average-pooling, wherein the convolutional kernel may be a pooling kernel.

The at least one of the blocks may be configured to pool data along a range dimension of the convolution.

A connection between two of the blocks may include a non-linear activation function.

The non-linear activation function may be a rectified linear unit.

The non-linear activation function may be implemented as a Taylor expansion around zero.

The sinogram-convolutional neural network may be configured to compute the features without performing image reconstruction of the raw tomographic data.

The sinogram-convolutional neural network may be trained based on training data including synthetic aperture radar data.

The sinogram-convolutional neural network may be trained based on training data including biological computed tomography data.

The sinogram-convolutional neural network may be trained based on training data including tomography data captured of a three-dimensional printed object.

According to one embodiment of the present invention, a system for computing classifications of raw tomographic data includes: a sinogram-convolutional neural network including a plurality of blocks connected to compute a plurality of features, at least one of the blocks being configured to perform a convolution of the raw tomographic data in Radon space with a convolutional kernel in Radon space by: slicing the raw tomographic data into a plurality of one-dimensional tomographic data slices along an angle dimension of the raw tomographic data; slicing the convolutional kernel into a plurality of one-dimensional kernel slices along the angle dimension of the convolutional kernel;

for each angle of the angle dimension, computing a one-dimensional convolution between: a corresponding one of the one-dimensional tomographic data slices at the angle; and a corresponding one of the one-dimensional kernel slices at the angle; and collecting the one-dimensional convolutions at each of the angles to compute the convolution of the raw tomographic data in Radon space and the convolutional kernel in Radon space, the system being configured to: extract a plurality of features from the raw tomographic data in Radon space using the sinogram-convolutional neural network; and compute the classifications of the raw tomographic data based on the features.

At least one of the blocks may be configured to compute an average-pooling, wherein the convolutional kernel may be a pooling kernel.

The at least one of the blocks may be configured to pool data along a range dimension of the convolution.

A connection between two of the blocks may include a non-linear activation function.

The non-linear activation function may be a rectified linear unit.

The non-linear activation function may be implemented as a Taylor expansion around zero.

The sinogram-convolutional neural network may be configured to compute the features without performing image reconstruction of the raw tomographic data.

The sinogram-convolutional neural network may be trained based on training data including synthetic aperture radar data.

The sinogram-convolutional neural network may be trained based on training data including biological computed tomography data.

The sinogram-convolutional neural network may be trained based on training data including tomography data captured of a three-dimensional printed object.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1C:
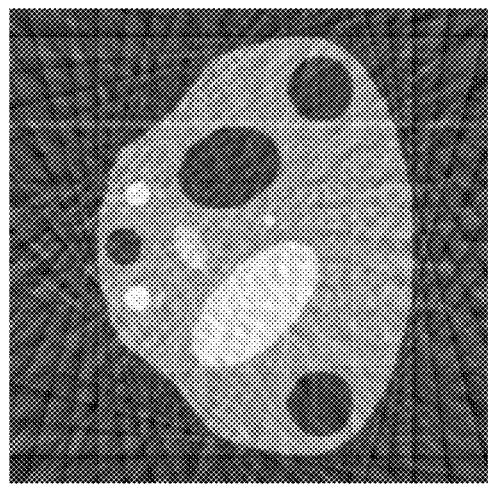
FIG. 1C depicts an image reconstructed from the raw tomographic data shown in FIG. 1B.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Some aspects of embodiments of the present invention relate to the direct application of deep learning to raw tomographic data, without image reconstruction. One aspect of embodiments of the present invention relates to defining deep convolutional neural networks for operating on raw tomographic data. Another aspect of embodiments of the present invention relates to deep learning structures for learning from raw tomography data.

Accordingly, aspects of embodiments of the present invention relate to systems and methods for machine learning of a task (e.g., classifying objects, detecting defects, etc.) directly from the raw tomography data without the need for an intermediate step of image formation or image reconstruction. The lack of image reconstruction allows embodiments of the present invention to enable faster inference (e.g., classification, detection, etc.), and the lack of image reconstruction noise results in higher accuracy (e.g., classification accuracy, defect detection classification, etc.).

Figure 1B:
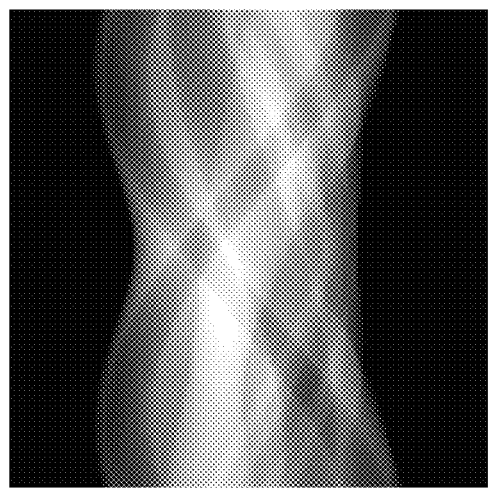
FIG. 1B depicts raw tomographic data.
Figure 1A:
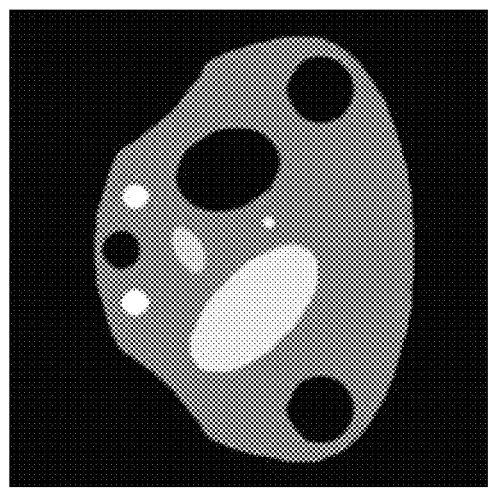
FIG. 1A depicts a ground truth image.

FIG. 1A depicts a ground truth image of a manufactured part, FIG. 1B depicts raw tomographic data of the part, and FIG. 1C depicts an image of the part reconstructed from the raw tomographic data shown in FIG. 1B. Applying a comparative convolutional neural network (CNN) to the raw tomographic data shown in FIG. 1B as a sinogram results in poor performance, because a comparative CNN is incompatible with the geometry of the raw tomographic data.

FIG. 1C shows the structured noise in the reconstruction of the part, and the structure of this noise depends on the angles of observation in the raw tomographic data (shown in FIG. 1B) and can vary for the same object (e.g., the same sample) when imaged under different tomography angles (e.g., if the object is rotated within the tomographic scanning device). Accordingly, these reconstructed images generally have a low signal-to-noise ratio (SNR), especially in limited-angle tomography. Accordingly, applying a comparative CNN to the reconstructed image data shown in FIG. 1C would also result in poor performance due to the noise, and would also be computationally expensive due to the image reconstruction.

In contrast, aspects of embodiments of the present invention relate to supplying the raw tomographic data, such as that shown in FIG. 1B, directly to a convolutional neural network in accordance with embodiments of the present invention, to compute, for example, features or classifications directly from the raw tomographic data. Note that this is different from using a convolutional neural network to reconstruct images from the raw tomographic data. Instead, embodiments of the present invention relate to computing features or classifications (e.g., the detection of defects) from the raw tomographic data.

Generally, a convolutional neural network is built from combinations of building blocks which include convolutional layers, pooling layers, and non-linear functions (also referred to as activation functions). Aspects of embodiments of the present invention relate to equivalent building blocks for a convolutional neural network capable of operating on raw tomographic data.

Generally, tomographic data is processed using the Radon transform. The d-dimensional Radon transform, $\mathcal{R}$, maps a function $I \in L^1(\mathbb{R}^d)$ where $$L^1(\mathbb{R}^d) := \left\{ I : \mathbb{R}^d \to \mathbb{R} \; \Big| \; \int_{\mathbb{R}^d} |I(x)| dx \leq \infty \right\}$$

to the set of its integrals over the hyperplanes of $\mathbb{R}^d$, which is called a sinogram (see, e.g., FIG. 1B), and can be defined, as shown in Equation 1, as:

$$\mathcal{R}I(t;\theta) = \int_X I(x)\delta(t - \theta \cdot x)dx, \; \forall \, \theta \in S^{d-1}, \; \forall \, t \in R$$

The inverse transform can be defined as shown in Equation 2:

$$I(x) = \mathcal{R}^{-1}(\mathcal{R}I(t,\theta))$$
$$= \int_{S^{d-1}} (\mathcal{R}I(\cdot,\theta) * h(\cdot)) \circ (x \cdot \theta) d\theta$$

where $h(\bullet)$ is a one-dimensional filter with corresponding Fourier transform $\mathcal{F} h(\omega) = c|\omega|^{d-1}$, where $*$ denotes convolution and $\circ$ denotes function evaluation. In some embodiments, the function $I(x)$ is a two-dimensional image, where $I \in L^1(\mathbb{R}^2)$. The Radon transform and its inverse are extensively used in Computerized Axial Tomography (CAT) scans in the field of medical imaging, where X-ray measurements integrate the tissue-absorption levels along 2D hyper-planes to provide a tomographic image of the internal organs. The Radon transform is also used in various industrial applications of micro-computed tomography (micro-CT), and it also provides the mathematical foundation for Synthetic Aperture Radar (SAR) imaging.

In practice, acquiring an infinite number of projections is not feasible; therefore, the integration in Equation 2 is typically replaced with a finite summation over projection angles, which leads to the filtered back projection algorithm and its multitude of variations, which are categorized as "inverse problems."

One building block of a convolutional neural network is the convolution operator. In a comparative convolutional neural network processing an image $I$ and using a convolutional kernel $\phi$, the convolution $J$ of the image $I$ with the kernel $\phi$ is given by Equation 3:

$$J(x) = (I * \phi) \circ (x) = \int_Y I(x - y)\phi(y)dy$$

Figure 2A:
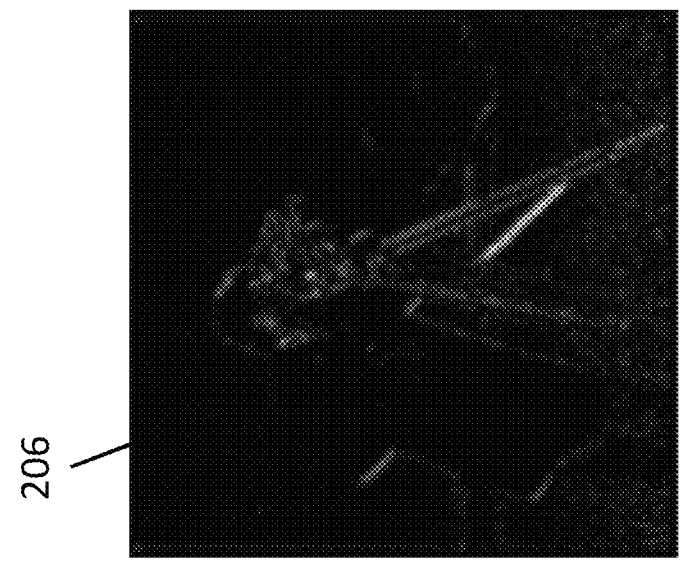
FIG. 2A depicts the convolution of an image with a convolutional kernel (a Gabor filter) to compute the convolution of the image with the kernel.
Figure 2A:
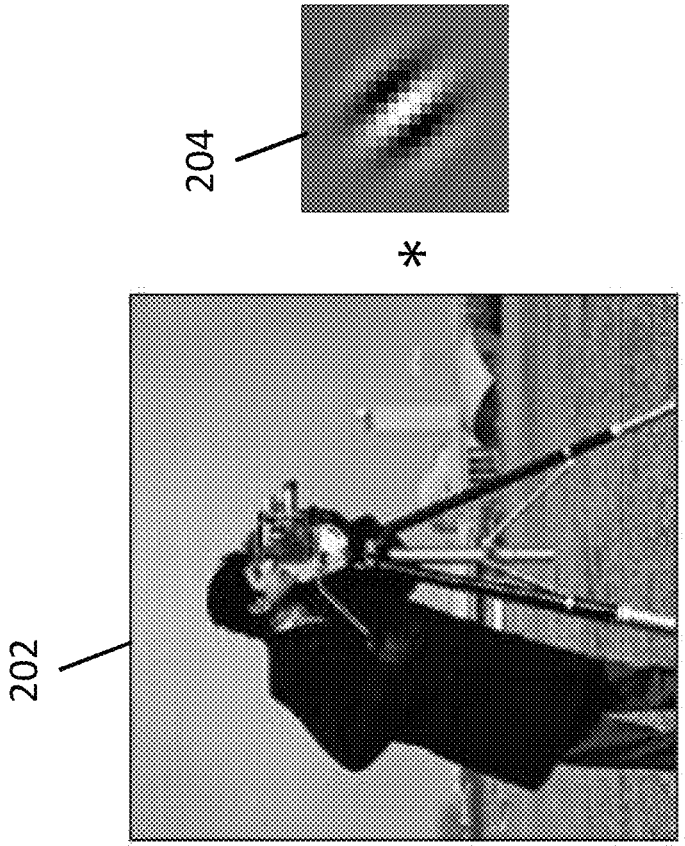

FIG. 2A depicts the convolution of an image $I$ 202 by a convolutional kernel $\phi$ 204 (a Gabor filter) to compute the convolution $J$ 206 of the image $I$ with the kernel $\phi$.

The convolution operator $*$ is spatially local (e.g., in Equation 3, the kernel operates on points around y for each point y in the image $I$). However, the sinograms obtained from the Radon transform images are not spatially local. For example, for $I(x) = \delta(x - x_0)$, the corresponding Radon transform is $\mathcal{R}(t,\theta) = \delta(t - x_0 \cdot \theta, \theta)$. Accordingly, the mathematical relationship between $\mathcal{R}J$ and $\mathcal{R}$ can be derived as follows to arrive at Equation 4:

$$\mathcal{R}J(t,\theta) = \int_X J(x)\delta(t - \theta \cdot x)dx$$
$$= \int_X \int_Y I(x - y)\phi(y)\delta(t - \theta \cdot x)dydx$$
$$= \int_Y \phi(y) \int_X I(x - y)\delta(t - \theta \cdot x)dxdy$$
$$= \int_Y \phi(y) \int_{X-y} I(\rho)\delta(t - \theta \cdot y - \rho \cdot \theta)d\rho dy$$
$$= \int_Y \phi(y)\mathcal{R}I(t - y \cdot \theta, \theta)dy$$
$$= \int_Y \int_{\mathbb{R}} \phi(y)\mathcal{R}I(\tau,\theta)\delta(\tau - t + y \cdot \theta)d\tau dy$$
$$= \int_{\mathbb{R}} \mathcal{R}I(\tau,\theta) \int_Y \phi(y)\delta(t - \tau - y \cdot \theta)dyd\tau$$
$$= \int_{\mathbb{R}} \mathcal{R}I(\tau,\theta)\mathcal{R}\phi(t - \tau, \theta)d\tau$$
$$= (\mathcal{R}I(\cdot,\theta) * \mathcal{R}\phi(\cdot,\theta)) \circ (t)$$

Figure 2B:
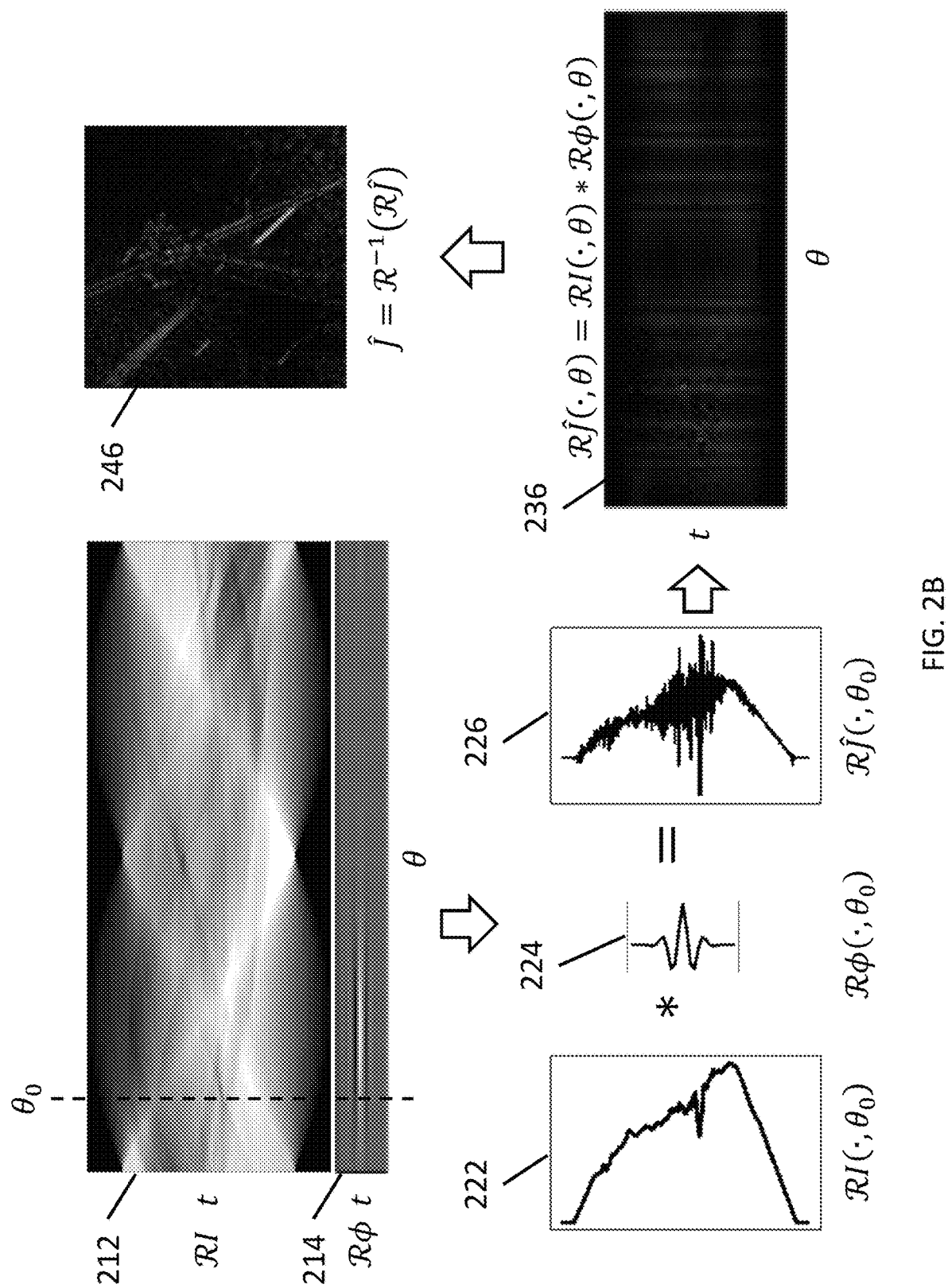
FIG. 2B depicts a convolution in the Radon space in accordance with one embodiment of the present invention.

FIG. 2B depicts a convolution in the Radon space in accordance with one embodiment of the present invention. As shown in FIG. 2B, the sinogram representations of the original image and of the kernel are represented as two-dimensional images having a range dimension t and an angle dimension 9.

Figure 2C:
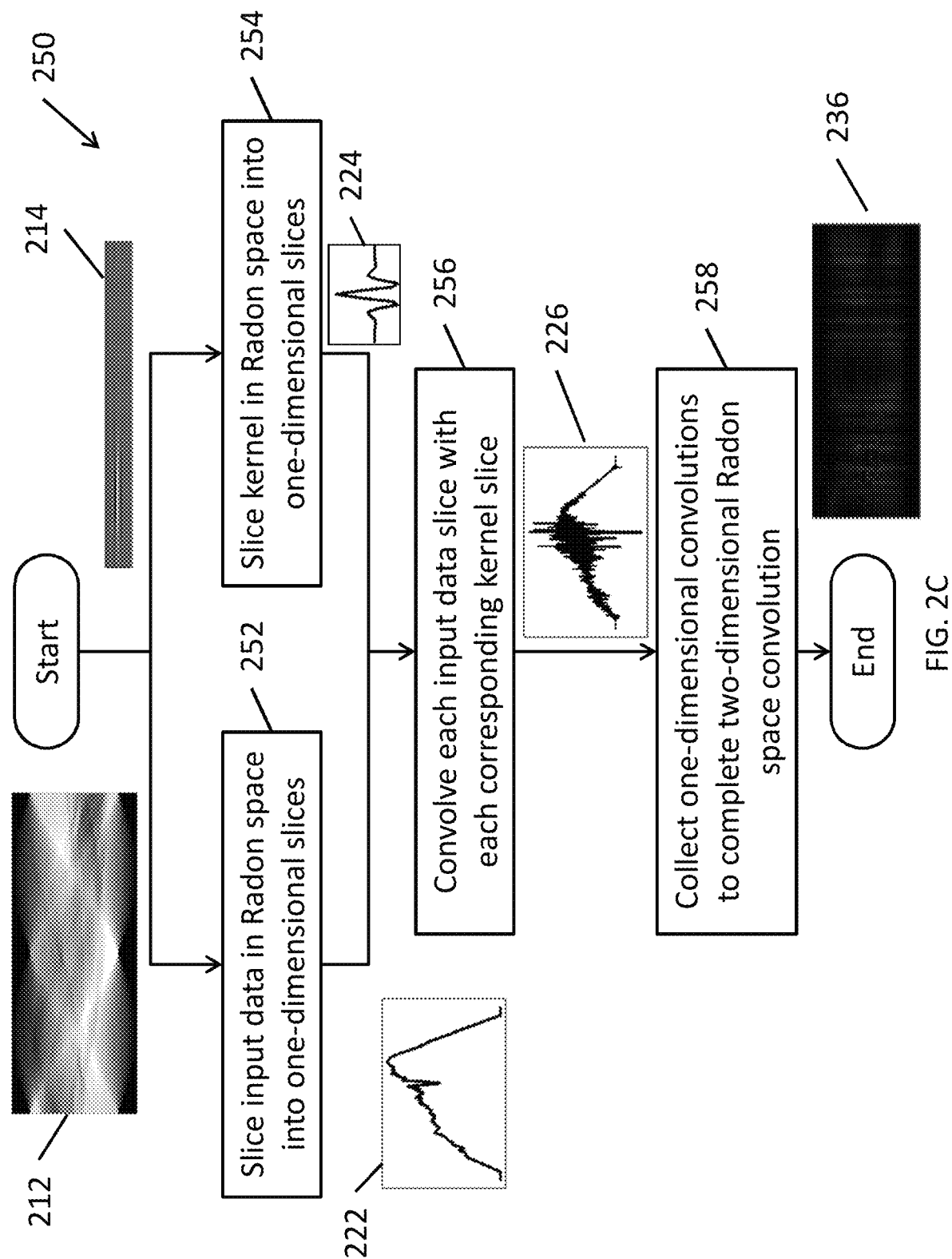
FIG. 2C is a flowchart of a method for performing a convolution in Radon space according to one embodiment of the present invention.

FIG. 2C is a flowchart of a method for performing a convolution in Radon space according to one embodiment of the present invention.

FIG. 2B shows a sinogram representation $\mathcal{R}$ 212 of the original image $I$ 202 in Radon space and a sinogram representation $\mathcal{R} \phi$ 214 of the original convolutional kernel 204 (the Gabor filter) in Radon space.

As shown in Equation 4, above, the d-dimensional convolution operator in the original space is equivalent to slicing the image $I$ and the convolutional kernel $\phi$ with respect to the angle dimension $\theta \in \mathbb{S}^{d-1}$ in operations 252 and 254, as shown in FIG. 2C, and performing one-dimensional convolutions between the slices of $\mathcal{R}(\bullet,\theta)$ and $\mathcal{R}\phi(\bullet,\theta)$ in operation 256, as shown in FIG. 2C. In FIG. 2B, one of these slices is identified by the dashed line labeled $\theta_0$. Each one-dimensional slice of the Radon space representation $\mathcal{R}$ 212 of the image (e.g., the slice at $\theta_0$: $\mathcal{R}(\bullet,\theta_0)$ 222) is convolved with the corresponding one-dimensional slice of the Radon space representation of the convolutional kernel (e.g., the slice at $\theta_0$: $\mathcal{R}\phi(\bullet,\theta_0)$ 224) to produce a convolution at each value of $\theta$. The separate one-dimensional convolutions are then collected in operation 258, as shown in FIG. 2C, to complete the convolution in Radon space $\mathcal{R}J(\bullet,\theta_0)$ 226.

Doing so for each slice 9 produces the resulting convolved sinogram $\mathcal{R}J(\bullet,\theta)$ 236. As a visual representation to confirm that the result is reasonable, an inverse Radon transformation $\mathcal{R}^{-1}$ is applied to the convolution in Radon space $\mathcal{R}J(\bullet,\theta_0)$ 236 to generate a reconstructed convolution 246. This can be rewritten as Equation 5:

$$J(x) = (I * \phi) \circ (x) = \mathcal{R}^{-1}(\mathcal{R}(\bullet,\theta) * \mathcal{R}\phi(\bullet,\theta)) \circ (t)$$

Comparing the reconstructed convolution 246 as processed through Radon space with the convolution 206 computed in image space reveals some minor reconstruction errors because the numerical implementation of the Radon transform and its inverse transform (e.g., limited projection angles) are inexact.

The pooling operation is another core component of a CNN. CNNs often utilize pooling operators to achieve local/partial translation invariance and also to reduce the dimensionality of the feature map, and these pooling operations may include, for example, "max-pooling," "average-pooling," and "norm-pooling." For the sake of clarity and convenience, the equivalent operator for "average-pooling" for sinograms will be described below.

Figure 3A:
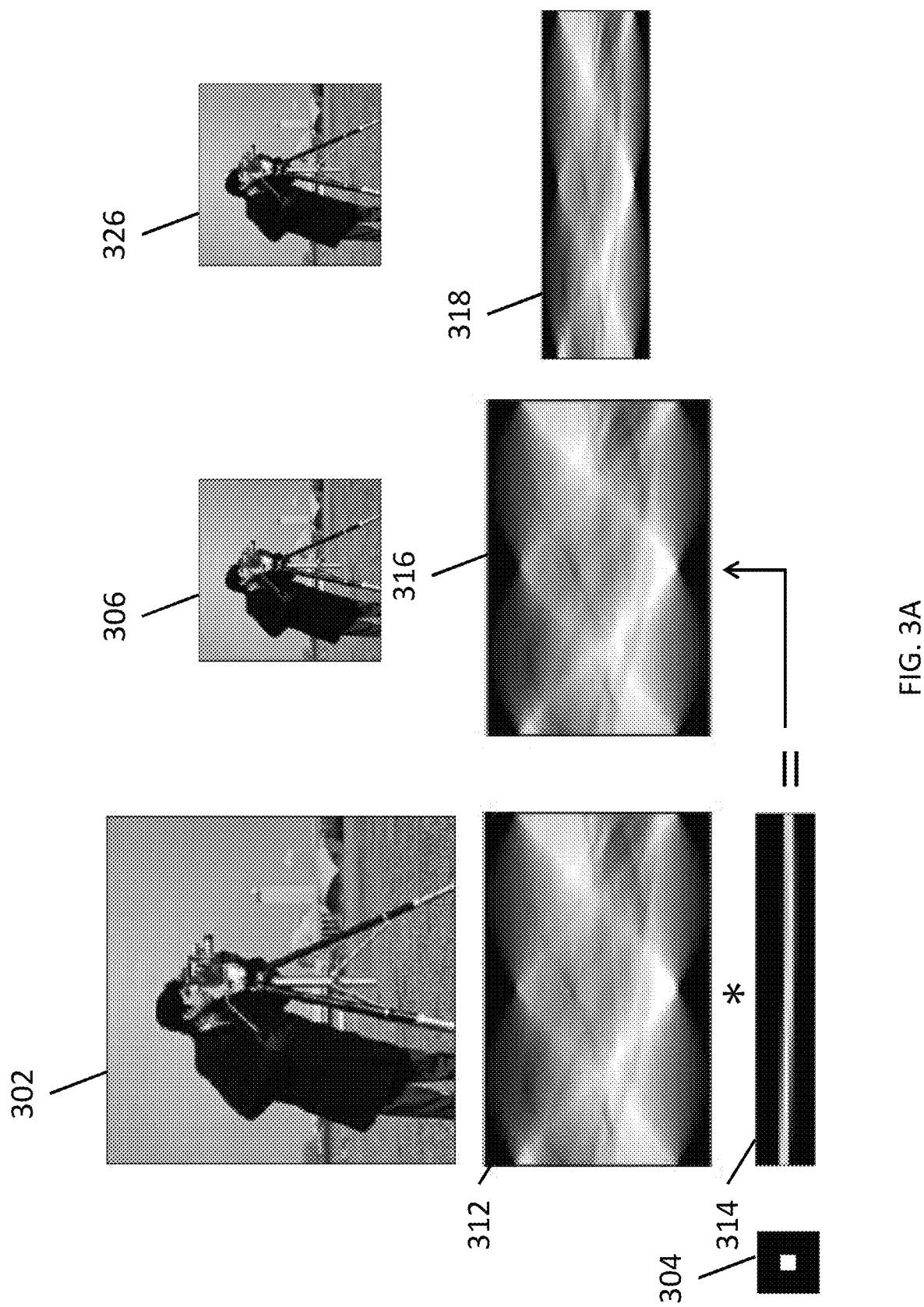
FIG. 3A is a schematic illustration of average-pooling in Radon space according to one embodiment of the present invention.

FIG. 3A is a schematic illustration of average-pooling in Radon space according to one embodiment of the present invention. Applying an average-pooling operation on an image 302 is equivalent to generating a down-sampled image 306. Taking a signal processing view, average-pooling can be decomposed into a low-pass filtering followed by multiplication with a dilated delta train. Equivalently, this can be viewed as a fixed sampling scheme (e.g., a fixed delta train) while rescaling the underlying image to achieve the down-sampling.

Accordingly, in one embodiment of the present invention, the equivalent scaling operation for sinograms by a factor of α is given by Equation 6:

$$J(x) = I(\alpha x)$$

$$\mathcal{R}J(t, \theta) = \int_X J(x)\delta(t - \theta \cdot x)dx$$

$$= \int_X I(\alpha x)\delta(t - \theta \cdot x)dx$$

$$= \int_X I(x)\delta\left(t - \theta \cdot \frac{x}{\alpha}\right)dx$$

$$= \int_X I(x)\delta(\alpha t - \theta \cdot x)dx = \mathcal{R}I(\alpha t, \theta)$$

This equation suggests that scaling an image by a factor of a leads to scaling the sinogram by the same factor along the range-axis t. This, in turn, implies that computing a 2×2 average-pooling in Radon space involves first convolving the sinogram with the 2×2 averaging kernel, and then pooling the sinogram along the range axis t.

Figure 3B:
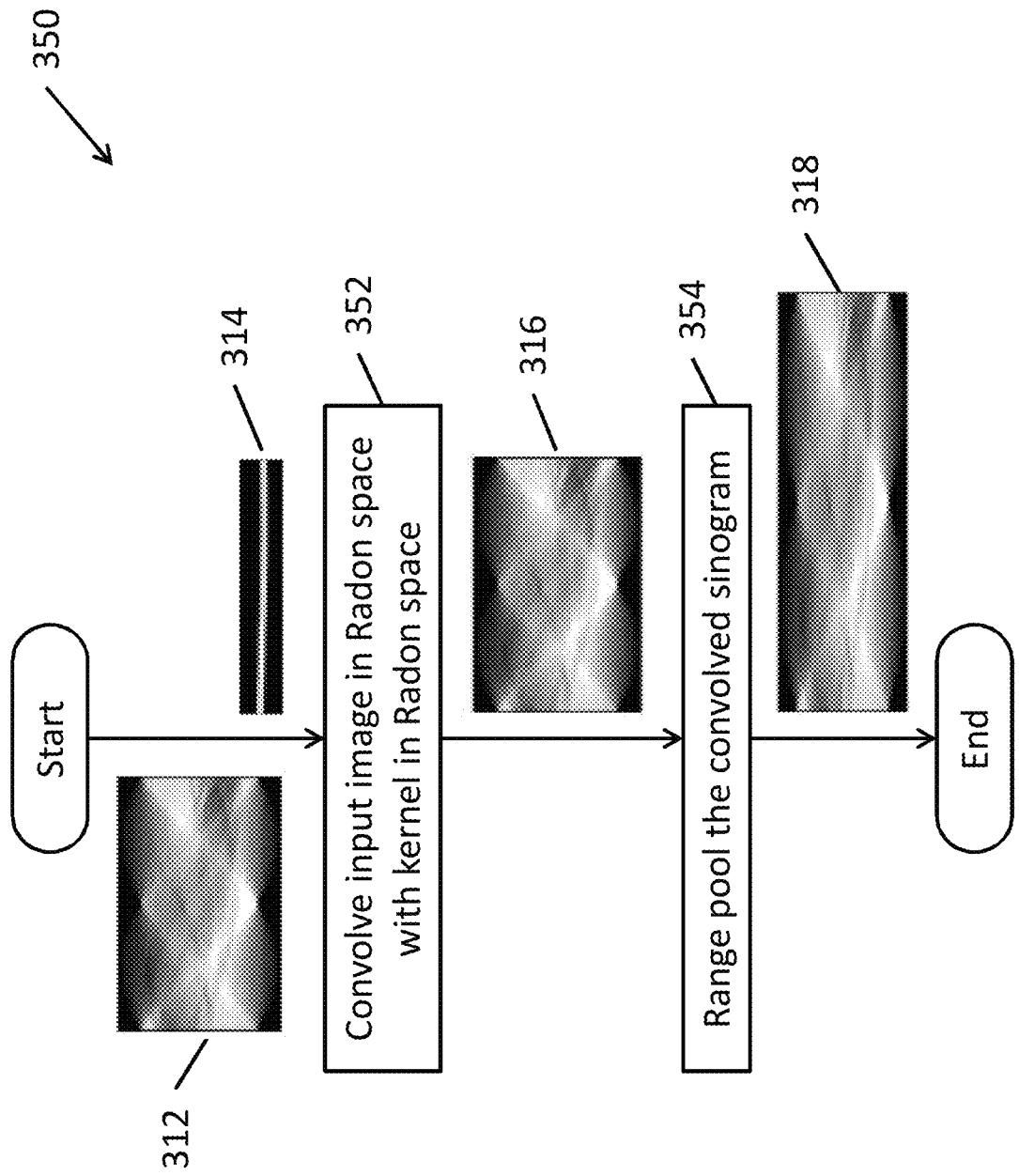
FIG. 3B is a flowchart of a method for performing average-pooling in Radon space according to one embodiment of the present invention.

Accordingly, FIG. 3B is a flowchart of a method 350 for performing average-pooling in Radon space according to one embodiment of the present invention. According to one embodiment of the present invention, the image $I$ 302 is transformed into Radon space to compute a sinogram $\mathcal{R}$ 312. Likewise, an average-pooling kernel φ 304 is transformed into Radon space to generate a kernel in Radon space $\mathcal{R}$ φ 314. In operation 352, an average-pooling module or block of a convolutional neural network convolves the sinogram $\mathcal{R}$ 312 with the average-pooling kernel in Radon space $\mathcal{R}$ φ 314, in accordance with the method for performing Radon space convolutions 250 shown above with respect to FIG. 2C, which results in the convolved sinogram 316. In operation 354, the convolved sinogram 316 is range pooled (along the range dimension or range-axis t) to compute the pooled sinogram 318. To verify the results, the pooled sinogram 318 can be inverse transformed to compute a reconstructed image 326 that has the same properties as the down-sampled image 306 (e.g., lower resolution than the original image 302).

Non-linear activation is the core component of a comparative CNN, which enables the network to approximate highly complex non-linear functions. While an equivalent operation does not exist in the space of sinograms, due to non-linearity, application of common non-linearities on sinograms is still valid. Below is one example of a non-linear function approximation on sinograms according to an embodiment of the present invention.

Letting σ: $\mathbb{R} \rightarrow \mathbb{R}$ be a general non-linear activation function:

$$J(x) = \sigma(I(x))$$

$$\mathcal{R}J(t, \theta) = \int_X J(x)\delta(t - \theta \cdot x)dx = \int_X \sigma(I(x))\delta(t - \theta \cdot x)dx$$

$$\neq \sigma\left(\int_X I(x)\delta(t - \theta \cdot x)dx\right) = \sigma(\mathcal{R}I(t, \theta))$$

However, for small values of $I$ (x), the Taylor expansion of the non-linear activation function a around zero gives:

$$\mathcal{R}J(t, \theta) = \int_X \sigma(I(x))\delta(t - \theta \cdot x)dx$$

$$\approx \int_X (\sigma(0) + \sigma'(0)I(x))\delta(t - \theta \cdot x)dx = \sigma(0) +$$

$$\sigma'(0)\int_X I(x)\delta(t - \theta \cdot x)dx$$

$$= \sigma(0) + \sigma'(0)\mathcal{R}I(t, \theta) \approx \sigma(\mathcal{R}I(t, \theta))$$

While the above approximation is only valid for small values of $I$ (x) and $\mathcal{R}$ (t,θ), it provides insight into the practicality of the idea of applying general non-linear activations to sinograms.

Figure 4A:
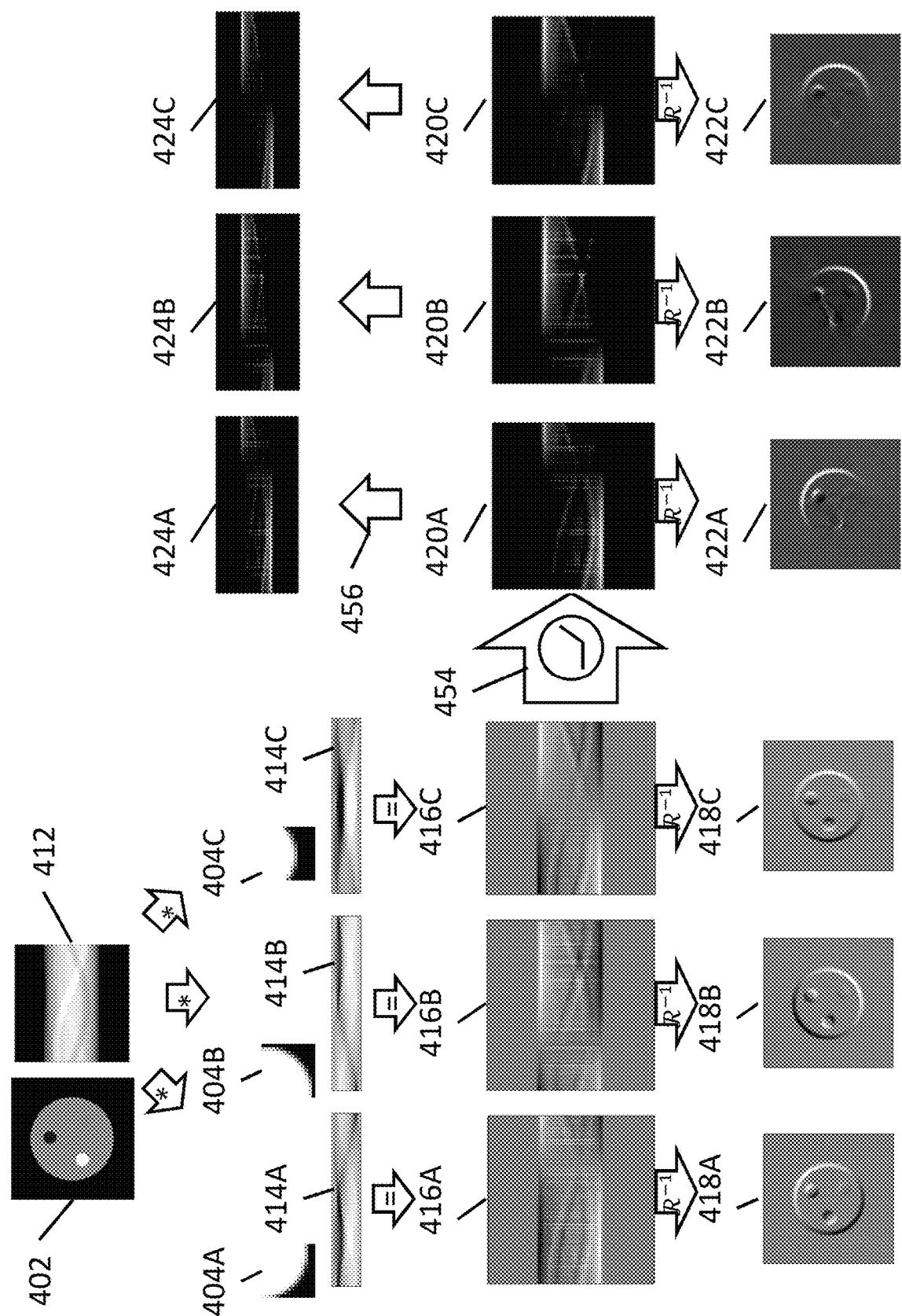
FIG. 4A is a schematic illustration of the application of non-linear activation (in particular, a rectified linear unit or ReLU) in a convolutional block according to one embodiment of the present invention.
Figure 4B:
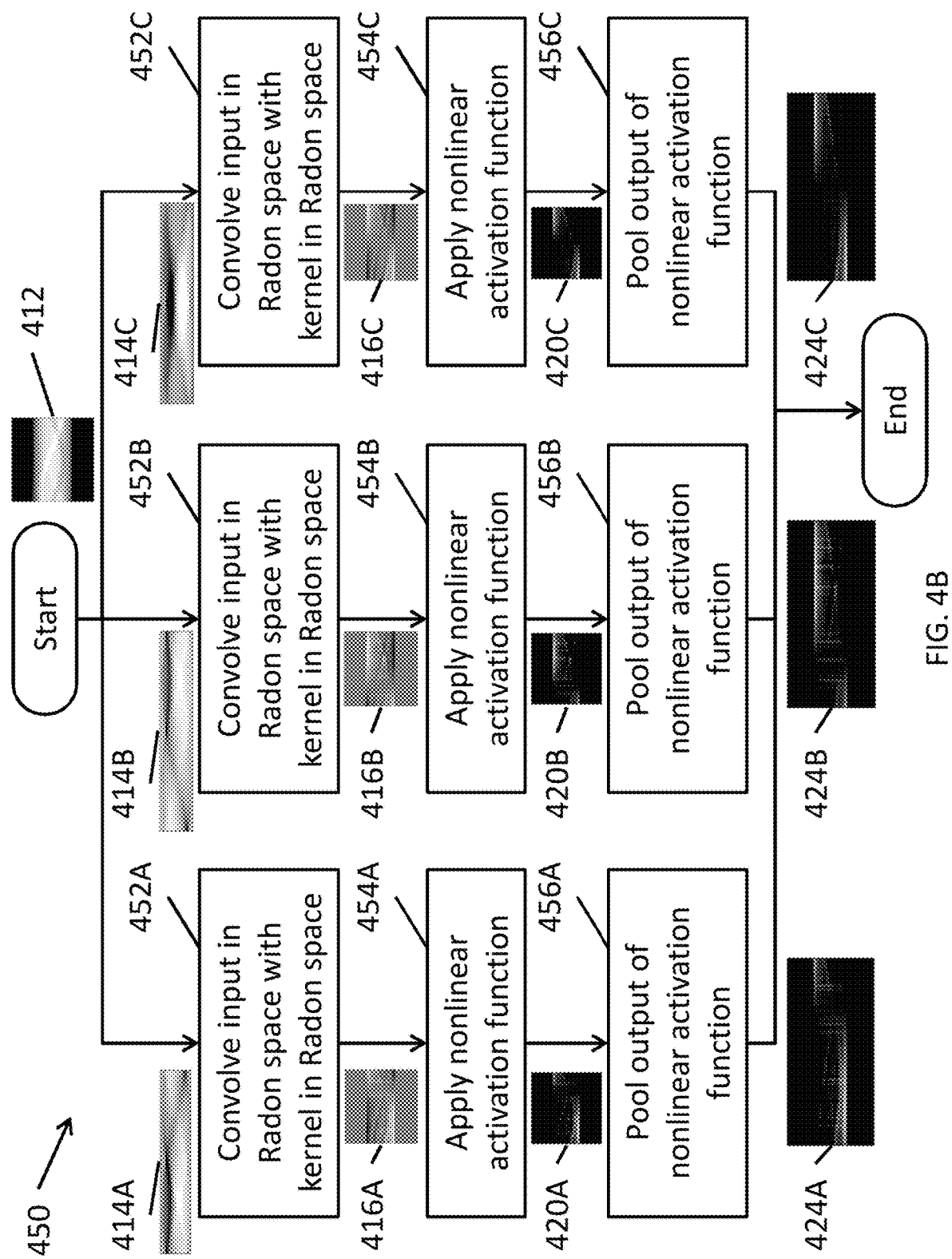
FIG. 4B is a flowchart of the operation of a convolutional block according to one embodiment of the present invention.

According to some embodiments of the present invention, the sinogram convolution in accordance with FIG. 2C, the sinogram pooling in accordance with FIG. 3B, and the non-linear activation in accordance with FIG. 4B are combined as building blocks for a sinogram convolutional neural network (Sinogram-CNN or S-CNN).

FIG. 4A is a schematic illustration of the application of non-linear activation (in particular, a rectified linear unit or ReLU) in a convolutional block according to one embodiment of the present invention. FIG. 4B is a flowchart of a method 450 of operating a convolutional block according to one embodiment of the present invention.

Referring to FIGS. 4A and 4B, the input to the convolutional block is a sinogram 412 obtained from computed tomography of the part shown as "Ground Truth" 402. In operations 452A, 452B, and 452C, the convolutional block applies three convolutional kernels 404A, 404B, and 404C, transformed into Radon space and represented by convolutional kernel sinograms 414A, 414B, and 414C, to the input sinogram 412 to compute Radon space convolutions 416A, 416B, and 416C. The reconstructed images 418A, 418B, and 418C are shown merely as an illustrative tool to demonstrate the effect of operations in raw tomography domain (e.g., Radon space) to the image space.

In operations 454A, 454B, and 454C, the non-linear activation function (a rectified linear unit or ReLU) is applied to the Radon space convolutions 414A, 414B, and 414C to compute outputs 420A, 420B, and 420C. Again, reconstructed images 422A, 422B, and 422C are shown merely as an illustrative tool to demonstrate the effect of the non-linear activation function. In operations 456A, 456B, and 456C, the convolutional block applies average-pooling to the outputs 420A, 420B, and 420C of the non-linear activation function to compute final outputs 424A, 424B, and 424C of the convolutional block.

Figure 5:
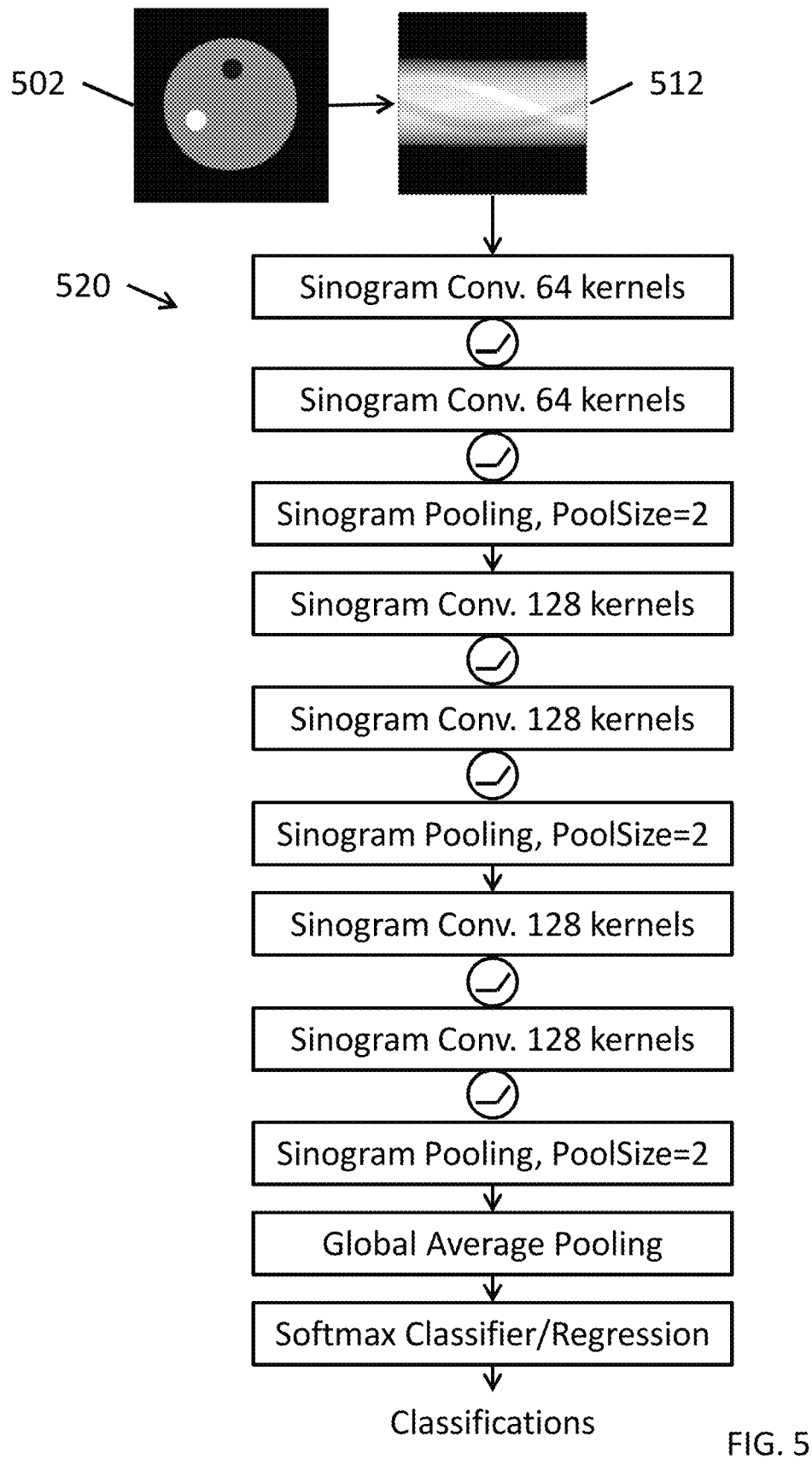
FIG. 5 is a block diagram of a Sinogram-CNN according to one embodiment of the present invention.

FIG. 5 is a block diagram of a Sinogram-CNN according to one embodiment of the present invention. The architecture is similar to the Visual Geometry Group (VGG) neural network described in K. Simonyan and A. Zisserman, "Very deep convolutional networks for large-scale image recognition," arXiv preprint arXiv:1409.1556, 2014. As shown in FIG. 5, raw tomography data 512 may be captured from a ground truth sample 502. The raw tomography data 512 is supplied to a deep Sinogram-convolutional neural network 520, which includes a first sinogram convolution block with 64 kernels connected, via a first non-linear activation function, to a second sinogram convolution block with 64 kernels connected, via a second non-linear activation function, to a first sinogram pooling block with a pooling size of 2, connected to a third sinogram convolution block with 128 kernels connected, via a third non-linear activation function, to a fourth sinogram convolution block with 128 kernels connected, via a fourth non-linear activation function, to a second sinogram pooling block with a pooling size of 2, connected to a fifth sinogram convolution block with 128 kernels connected, via a fifth non-linear activation function, to a sixth sinogram convolution block with 128 kernels connected, via a sixth non-linear activation function, to a third sinogram pooling block with a pooling size of 2, connected to a global average-pooling block connected to a softmax classifier/regression block configured to compute one or more classifications (e.g., a confidence or probability that the object represented by the ground truth 502 and the raw tomography data 512 should be classified as being defective).

Figure 6:
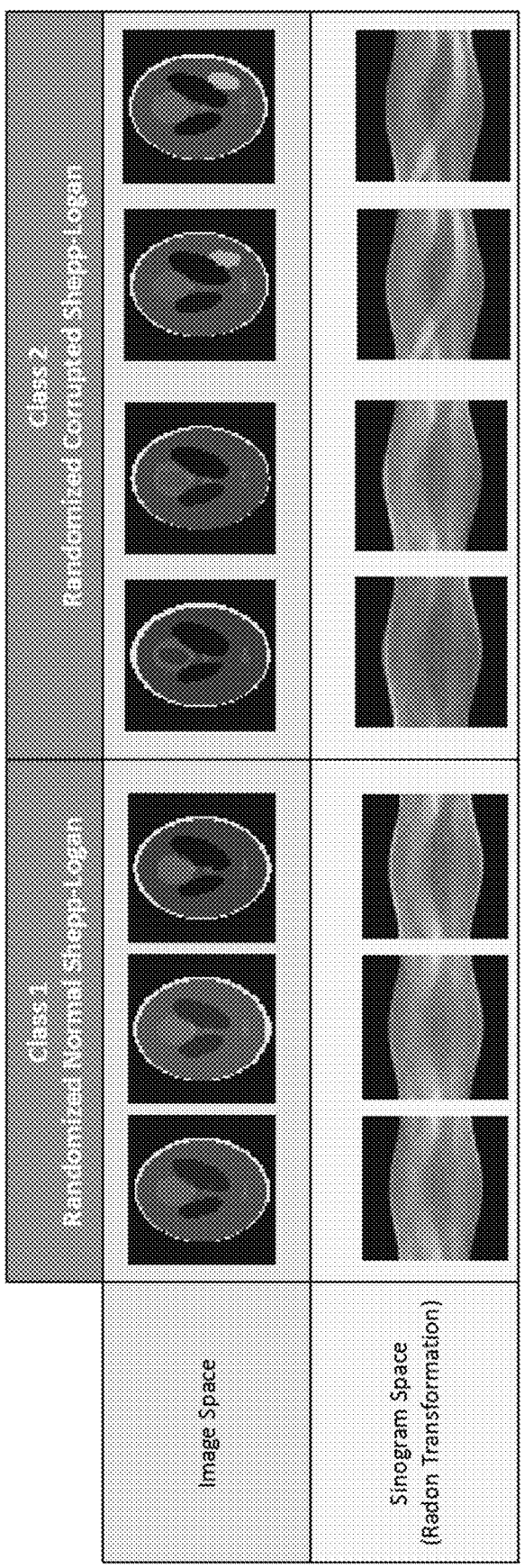
FIG. 6 depicts examples of tomographic data that may be classified by embodiments of the present invention.

As noted above, embodiments of the present invention improve the field of automatic computer classification of tomographic data by avoiding or omitting a costly intermediate step of image generation. For example, a dataset of 2,000 samples was generated, where the dataset included a first group of 1,000 samples of randomized normal Shepp-Logan phantoms and a second group of 1,000 samples of randomized corrupted Shepp-Logan phantoms, each sample including a sinogram in Radon space and a corresponding image in image space. The normal Shepp-Logan samples and corrupted Shepp-Logan samples were divided into a training set and a test set. FIG. 6 depicts examples of tomographic data that may be classified by embodiments of the present invention. FIG. 6 also depicts images corresponding to the tomographic data.

The training set was used to train a CNN in image space and a CNN in sinogram space. The CNN in image space was trained to classify input images as being "normal" or "corrupted" with 100% accuracy on the training set, and was also able to classify the test images with 100% accuracy. The CNN in sinogram space was trained on the training sinograms and was able to classify the training sinograms with 100% accuracy, but was unable to classify the test sinograms accurately.

The training set was also used to train a Sinogram-CNN in accordance with embodiments of the present invention, and the resulting trained Sinogram-CNN was able to classify the training sinograms with 100% accuracy and the test sinograms with 100% accuracy.

As such, embodiments of the present invention are directed to systems and methods for direct learning and processing of raw tomographic data by constructing sinogram convolutional neural networks using operations adapted to work with sinograms, including sinogram convolution operations, sinogram pooling operations, and sinogram non-linear activation operations.

In more detail, in some embodiments of the present invention, a training system is configured to train sinogram convolutional neural networks (S-CNNs) based on supplied training data for particular contexts. For example, in the case of training a sinogram convolutional neural network to recognize targets in synthetic aperture radar (SAR) data, the training data may include raw SAR data and the corresponding labels of the targets that are present in the raw SAR data. This training data may be generated from known, reliable sources. The initial weights of an S-CNN may be initially set to random values, and the raw SAR data may then be supplied as inputs to the S-CNN. By iteratively comparing the outputs of the S-CNN to the known labels and updating the weights of the connections between the layers of the S-CNN (e.g., using the backpropagation algorithm; see, e.g., D. E. Rumelhart, R. Durbin, R. Golden, and Y. Chauvin, "Backpropagation: The basic theory," Backpropagation: Theory, architectures and applications, pp. 1-34, 1995.), the weights of the S-CNN are learned.

As noted above, the training data may be selected based on the type of problem to be analyzed by the S-CNN. For example, in 3D printing and manufacturing, labeled, raw tomographic data of defective and non-defective parts may be supplied as training data. As another example, in the case of tumor detection, labeled, raw tomographic data of computed tomography X-ray data may be supplied as training data.

Computing Systems

Figure 7:
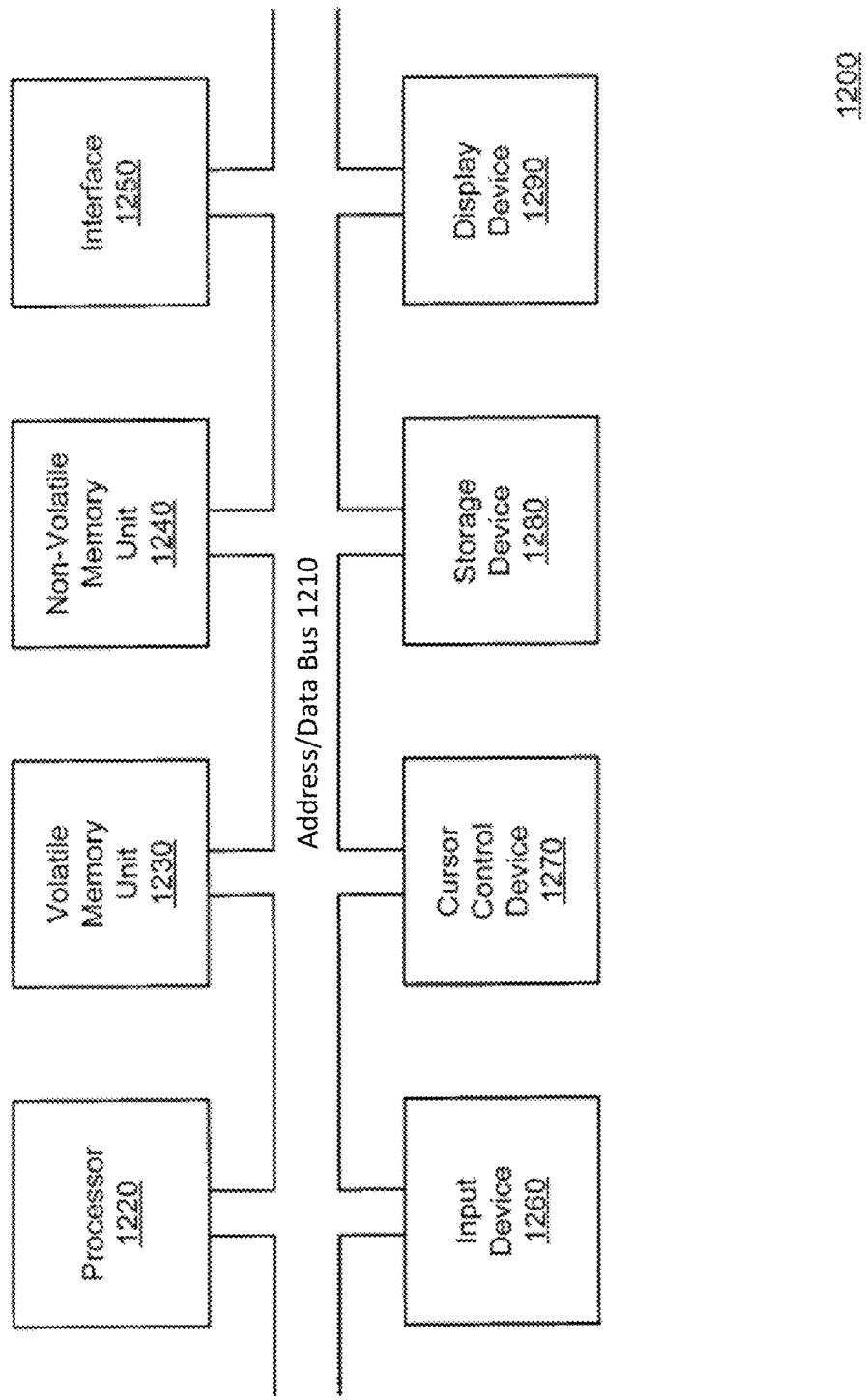
FIG. 7 is a block diagram of a computer system that may be used in conjunction with embodiments of the present invention.

An exemplary computer system 1200 in accordance with an embodiment is shown in FIG. 7. Computer systems similar to those described herein may be used, for example, to implement a training system for training the sinogram convolutional network described above and/or for implementing a sinogram convolutional neural network to compute classifications (for performing "inference" or "forward propagation") but embodiments of the present invention are not limited thereto. The exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the exemplary computer system 1200. When executed, the instructions cause the exemplary computer system 1200 to perform specific actions and exhibit specific behavior, such as described herein.

The exemplary computer system 1200 may include an address/data bus 1210 that is configured to communicate information. Additionally, one or more data processing units, such as a processor 1220, are coupled with the address/data bus 1210. The processor 1220 is configured to process information and instructions. In an embodiment, the processor 1220 is a microprocessor. Alternatively, the processor 1220 may be a different type of processor, such as a parallel processor or a field programmable gate array.

The exemplary computer system 1200 is configured to utilize one or more data storage units. The exemplary computer system 1200 may include a volatile memory unit 1230 (e.g., random access memory ("RAM"), static RAM, dynamic RAM, etc.) coupled with the address/data bus 1210, wherein the volatile memory unit 1230 is configured to store information and instructions for the processor 1220.

The exemplary computer system 1200 further may include a non-volatile memory unit 1240 (e.g., read-only memory ("ROM"), programmable ROM ("PROM"), erasable programmable ROM ("EPROM"), electrically erasable programmable ROM ("EEPROM"), flash memory, etc.) coupled with the address/data bus 1210, wherein the non-volatile memory unit 1240 is configured to store static information and instructions for the processor 1220. Alternatively, the exemplary computer system 1200 may execute instructions retrieved from an online data storage unit, such as in "cloud" computing. In an embodiment, the exemplary computer system 1200 also may include one or more interfaces, such as an interface 1250, coupled with the address/data bus 1210. The one or more interfaces are configured to enable the exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, the exemplary computer system 1200 may include an input device 1260 coupled with the address/data bus 1210, wherein the input device 1260 is configured to communicate information and command selections to the processor 1220. In accordance with one embodiment, the input device 1260 is an alphanumeric input device, such as a keyboard, that may include alphanumeric and/or function keys. Alternatively, the input device 1260 may be an input device other than an alphanumeric input device. In an embodiment, the exemplary computer system 1200 may include a cursor control device 1270 coupled with the address/data bus 1210, wherein the cursor control device 1270 is configured to communicate user input information and/or command selections to the processor 1220. In an embodiment, the cursor control device 1270 is implemented utilizing a device such as a mouse, a track-ball, a track-pad, an optical tracking device, or a touchscreen. The foregoing notwithstanding, in an embodiment, the cursor control device 1270 is directed and/or activated via input from the input device 1260, such as in response to the use of special keys and key sequence commands associated with the input device 1260. In an alternative embodiment, the cursor control device 1270 is configured to be directed or guided by voice commands.

In an embodiment, the exemplary computer system 1200 further may include one or more optional computer usable data storage devices, such as a storage device 1280, coupled with the address/data bus 1210. The storage device 1280 is configured to store information and/or computer executable instructions. In one embodiment, the storage device 1280 is a storage device such as a magnetic or optical disk drive (e.g., hard disk drive ("HDD"), floppy diskette, compact disc read-only memory ("CD-ROM"), digital versatile disc ("DVD")). Pursuant to one embodiment, a display device 1290 is coupled with the address/data bus 1210, wherein the display device 1290 is configured to display video and/or graphics. In an embodiment, the display device 1290 may include a cathode ray tube ("CRT"), liquid crystal display ("LCD"), field emission display ("FED"), plasma display, or any other display device suitable for displaying video and/or graphic images and alphanumeric characters recognizable to a user.

The exemplary computer system 1200 is presented herein as an exemplary computing environment in accordance with an embodiment. However, the exemplary computer system 1200 is not strictly limited to being a computer system. For example, an embodiment provides that the exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components, and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for computing classification of raw tomographic data, the method comprising:
    supplying the raw tomographic data to a sinogram-convolutional neural network, the sinogram-convolutional neural network comprising a plurality of blocks connected to compute a plurality of features, at least one of the blocks being configured to perform a convolution of the raw tomographic data in Radon space with a convolutional kernel in Radon space by:
        slicing the raw tomographic data into a plurality of one-dimensional tomographic data slices along an angle dimension of the raw tomographic data;
        slicing the convolutional kernel into a plurality of one-dimensional kernel slices along the angle dimension of the convolutional kernel;
        for each angle of the angle dimension, computing a one-dimensional convolution between:
            a corresponding one of the one-dimensional tomographic data slices at the angle; and
            a corresponding one of the one-dimensional kernel slices at the angle; and
        collecting the one-dimensional convolutions at each of the angles to compute the convolution of the raw tomographic data in Radon space with the convolutional kernel in Radon space;
    extracting a plurality of features from the raw tomographic data in Radon space using the sinogram-convolutional network; and
    computing the classifications of the raw tomographic data based on the features.

2. The method of claim 1, wherein at least one of the blocks is configured to compute an average-pooling, wherein the convolutional kernel is a pooling kernel.

3. The method of claim 2, wherein the at least one of the blocks is configured to pool data along a range dimension of the convolution.

4. The method of claim 1, wherein a connection between two of the blocks comprises a non-linear activation function.

5. The method of claim 4, wherein the non-linear activation function is a rectified linear unit.

6. The method of claim 5, wherein the non-linear activation function is implemented as a Taylor expansion around zero.

7. The method of claim 1, wherein the sinogram-convolutional neural network is configured to compute the features without performing image reconstruction of the raw tomographic data.

8. The method of claim 1, wherein the sinogram-convolutional neural network is trained based on training data comprising synthetic aperture radar data.

9. The method of claim 1, wherein the sinogram-convolutional neural network is trained based on training data comprising biological computed tomography data.

10. The method of claim 1, wherein the sinogram-convolutional neural network is trained based on training data comprising tomography data captured of a three-dimensional printed object.

11. A system for computing classifications of raw tomographic data, comprising:
    a sinogram-convolutional neural network comprising a plurality of blocks connected to compute a plurality of features, at least one of the blocks being configured to perform a convolution of the raw tomographic data in Radon space with a convolutional kernel in Radon space by:
        slicing the raw tomographic data into a plurality of one-dimensional tomographic data slices along an angle dimension of the raw tomographic data;
        slicing the convolutional kernel into a plurality of one-dimensional kernel slices along the angle dimension of the convolutional kernel;
        for each angle of the angle dimension, computing a one-dimensional convolution between:
            a corresponding one of the one-dimensional tomographic data slices at the angle; and
            a corresponding one of the one-dimensional kernel slices at the angle; and
        collecting the one-dimensional convolutions at each of the angles to compute the convolution of the raw tomographic data in Radon space and the convolutional kernel in Radon space,
    the system being configured to:
        extract a plurality of features from the raw tomographic data in Radon space using the sinogram-convolutional neural network; and
        compute the classifications of the raw tomographic data based on the features.

12. The system of claim 11, wherein at least one of the blocks is configured to compute an average-pooling, wherein the convolutional kernel is a pooling kernel.

13. The system of claim 12, wherein the at least one of the blocks is configured to pool data along a range dimension of the convolution.

14. The system of claim 11, wherein a connection between two of the blocks comprises a non-linear activation function.

15. The system of claim 14, wherein the non-linear activation function is a rectified linear unit.

16. The system of claim 15, wherein the non-linear activation function is implemented as a Taylor expansion around zero.

17. The system of claim 11, wherein the sinogram-convolutional neural network is configured to compute the features without performing image reconstruction of the raw tomographic data.

18. The system of claim 11, wherein the sinogram-convolutional neural network is trained based on training data comprising synthetic aperture radar data.

19. The system of claim 11, wherein the sinogram-convolutional neural network is trained based on training data comprising biological computed tomography data.

20. The system of claim 11, wherein the sinogram-convolutional neural network is trained based on training data comprising tomography data captured of a three-dimensional printed object.

* * * * *